(12) United States Patent
Xu et al.

(10) Patent No.: US 7,271,513 B2
(45) Date of Patent: Sep. 18, 2007

(54) THERMAL STRESS RELIEVED OVERMOLDED MOUNTING BASE

(75) Inventors: Mo Xu, Singapore (SG); Poh Lye Lim, Singapore (SG); WaiOnn Chee, Singapore (SG); Niroot Jierapipatanakul, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 306 days.

(21) Appl. No.: 11/106,952

(22) Filed: Apr. 15, 2005

(65) Prior Publication Data

US 2006/0232876 A1 Oct. 19, 2006

(51) Int. Cl.
*H02K 5/00* (2006.01)
(52) U.S. Cl. .......................... 310/43; 310/89; 310/91; 360/97.01; 360/97.02; 264/272.13; 720/696; 720/697
(58) Field of Classification Search .................. 29/596, 29/598; 310/43, 89, 91; 264/272.13, 272.19, 264/272.2, 230, 231, 232, 234, 237; 360/97.01, 360/97.02; 720/696, 697, 698
See application file for complete search history.

(56) References Cited

U.S. PATENT DOCUMENTS

| | | | |
|---|---|---|---|
| 4,553,183 A * | 11/1985 | Brown et al. ............ | 360/97.02 |
| 5,370,517 A | 12/1994 | Cesati et al. ................ | 425/116 |
| 6,552,869 B1 * | 4/2003 | Takahashi et al. ........ | 360/97.01 |
| 2002/0051338 A1 | 5/2002 | Jiang et al. .................. | 361/685 |
| 2002/0196724 A1 | 12/2002 | Henrichs .................... | 369/75.1 |
| 2003/0071382 A1 | 4/2003 | Neal .......................... | 264/40.5 |
| 2003/0218827 A1 | 11/2003 | Teo et al. ................ | 360/97.01 |

* cited by examiner

Primary Examiner—Karl Tamai
Assistant Examiner—David W. Scheuermann
(74) Attorney, Agent, or Firm—Westman, Champlin & Kelly, P.A.

(57) ABSTRACT

A method of manufacturing and an overmolded mounting base. A plate is provided with mounting surfaces having a range of alignments including a nominal alignment. The plate is overmolded to form an overmolded plate. The overmolding changes the alignment of the mounting surfaces. The overmolded plate is maintained at a creep temperature for a time interval sufficient for creep to restore the alignment toward the nominal alignment.

20 Claims, 6 Drawing Sheets

THERMAL STRESS RELIEVED OVERMOLDED MOUNTING BASE

FIELD OF THE INVENTION

The present invention relates generally to relieving stress in overmolded parts, and more particularly but not by limitation to relieving stress on metal inserts in injection molded plastic parts.

BACKGROUND OF THE INVENTION

As disc drives are made increasingly smaller, it becomes difficult to form a disc drive mounting base out of a single component or material that can be economically shaped to provide properly aligned functional surface for receiving disc drive internal components. In particular, as the housing becomes thinner, it is increasingly difficult to maintain alignment, particularly parallelism, between mounting surfaces for spindle motors and actuator pivots. There is a desire to combine thin metal parts and plastic parts to form a housing assembly. It is found however, that high shrinkage rates of plastic parts after molding tends to distort or warp thin metal parts so that mounting surfaces on the metal parts are not adequately aligned.

A method and a mounting base are needed that combine thin metal parts with plastic parts in a way that reduces distortion of the thin metal parts. Embodiments of the present invention provide solutions to these and other problems, and offer other advantages over the prior art.

SUMMARY OF THE INVENTION

Disclosed are a method of manufacturing and an overmolded mounting base. A plate is provided with mounting surfaces having a range of alignments including a nominal alignment. The plate is overmolded to form an overmolded plate. The overmolding changes the alignment of the mounting surfaces. The overmolded plate is maintained at a creep temperature for a time interval sufficient for creep to restore the nominal alignment.

Other features and benefits that characterize embodiments of the present invention will be apparent upon reading the following detailed description and review of the associated drawings.

DETAILED DESCRIPTION OF ILLUSTRATIVE EMBODIMENTS

In the embodiments described below, an overmolded mounting base includes a metal insert with peripheral edges molded into an overmolded plastic rim. The overmolded plastic part shrinks when it cools after the molding process and distorts or bows a portion or all of the metal insert. The assembly of the overmolded plastic part and the metal insert are then heated and maintained at a creep temperature of the plastic part for a long period of time. The overmolded plastic part creeps in response to the mechanic stress in the bowed metal insert. Over time, the creep of the overmolded plastic part allows the bowed metal insert to substantially recover and move toward its original shape. Mounting surfaces on the metal insert are returned to acceptable alignment, and components can be mounted on the mounting surfaces with improved operational alignment. The process and overmolded mounting base are useful in small form factor disc drives as well as other applications.

Figure 1:
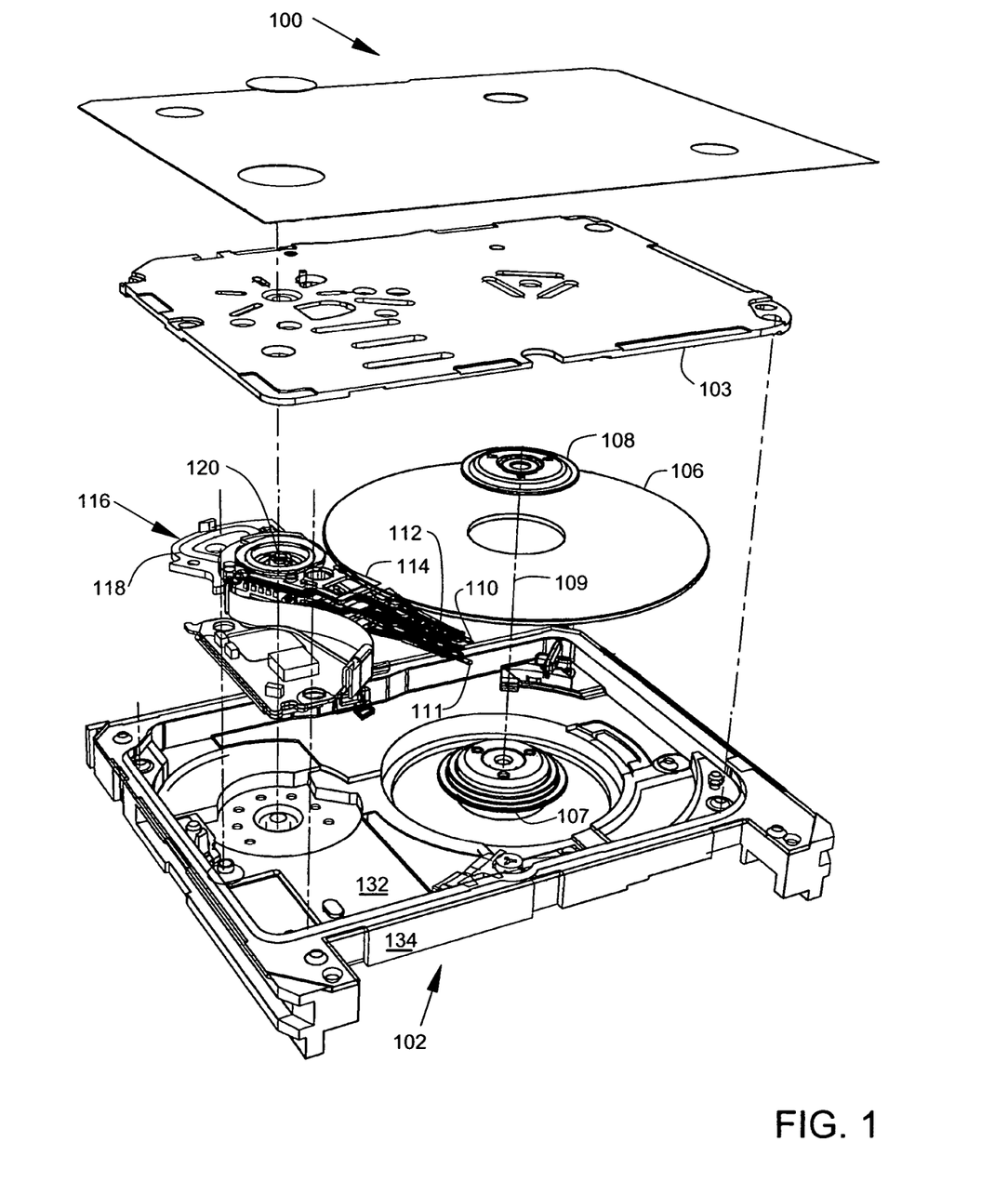
FIG. 1 is an oblique view of a disc drive.

FIG. 1 is an exploded view of a disc drive 100 in which embodiments of the present invention are useful. Disc drive 100 includes a housing with a base 102 and a top cover 103. The base 102 comprises an overmolded base that includes a central metal mounting plate 132 and an plastic rim 134 that is overmolded on the central metal plate 132 as described in more detail below in connection with an example illustrated in FIGS. 2-3. Disc drive 100 further includes a disc 106, which is mounted on a spindle motor 107 by a disc clamp 108. Disc 106 is mounted for rotation about a central axis 109. Each disc surface of disc 106 has an associated disc head slider 110, 111 which is mounted to disc drive 100 for communication with one of the disc surfaces. In the example shown in FIG. 1, sliders 110, 111 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110, 111 about a pivot shaft 120 to position heads 110, 111 over a desired data track along an arcuate path on the disc between a disc inner diameter and a disc outer diameter.

Figure 2:
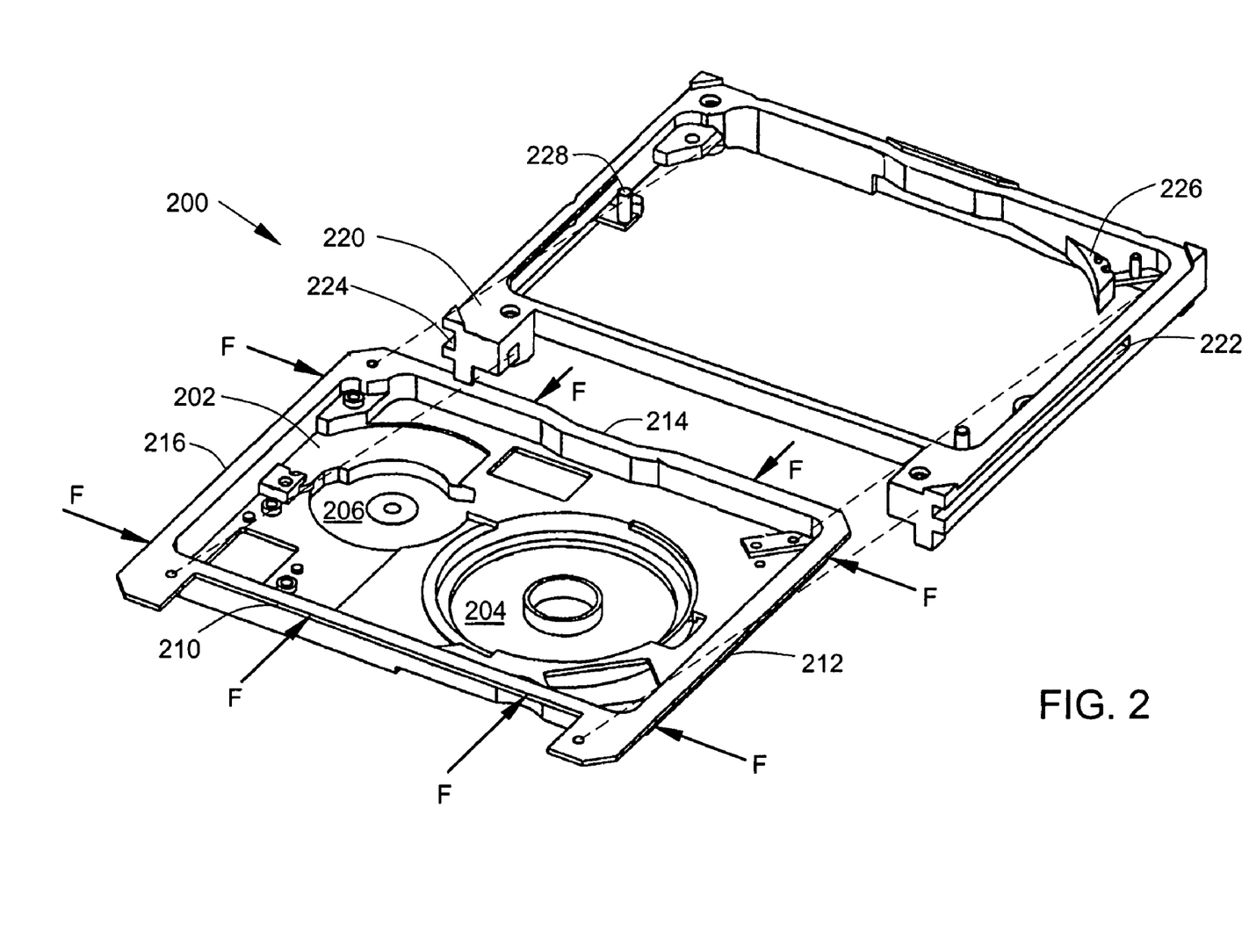
FIG. 2 illustrates an exploded view of an overmolded mounting base.
Figure 3:
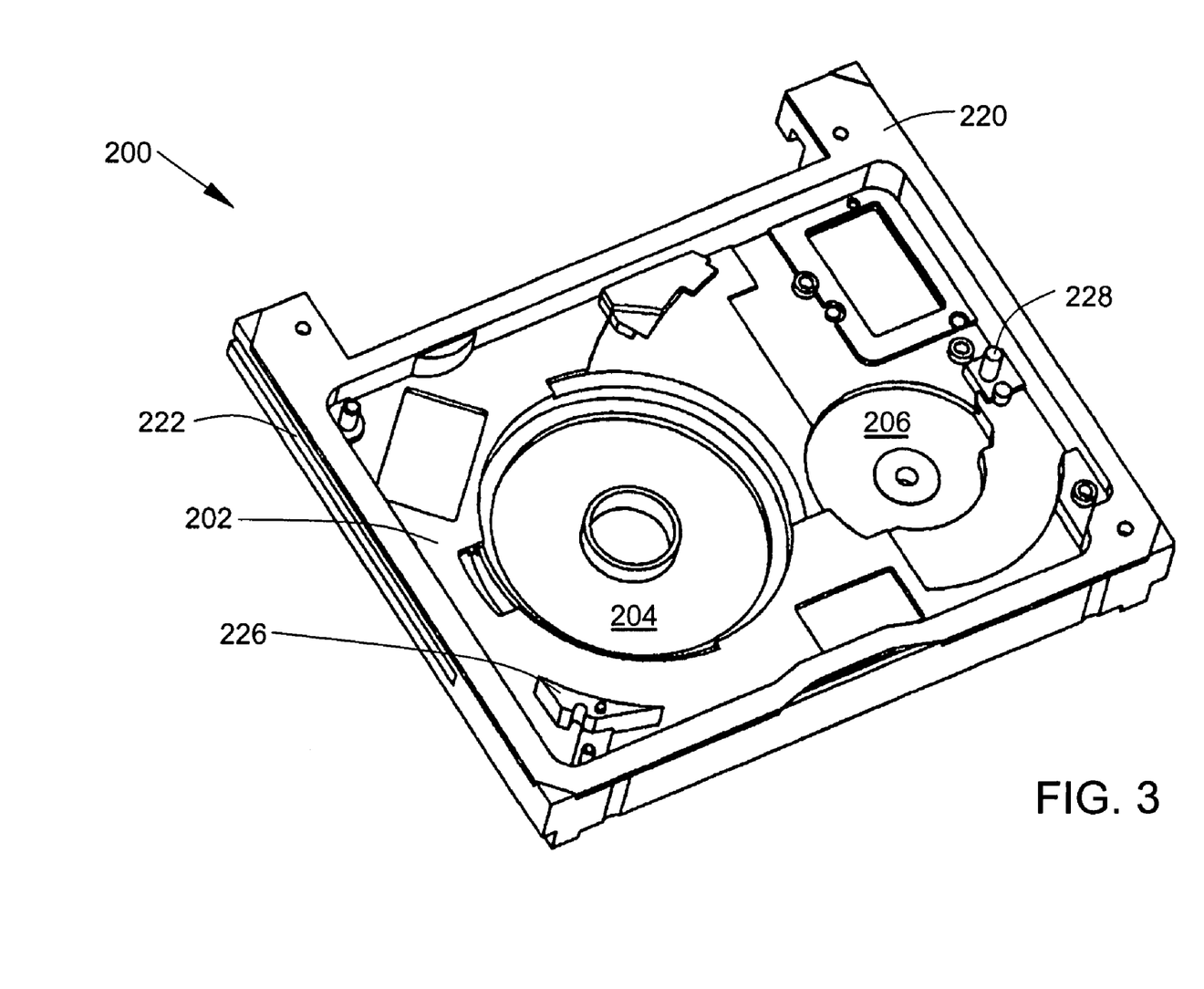
FIG. 3 illustrates an oblique view of the overmolded mounting base shown in FIG. 2.

FIG. 2 illustrates an exploded view of an overmolded mounting base 200. FIG. 3 illustrates an oblique view of the overmolded mounting base 200. The overmolded mounting base 200 comprises a plate 202. The plate 202 preferably comprises an aluminum casting, however plate 202 can also comprise a stamped metal part. The plate 202 has mounting surfaces 204, 206 for mounting components. The mounting surface 204 preferably serves as a spindle motor mounting. The mounting surface 206 preferably serves as an actuator pivot shaft mounting. The mounting surfaces 204, 206 are preferably flat surfaces that are parallel to one another in a nominal alignment. Plate 202 may also be utilized for the mounting of other components further comprising the disc drive 100.

When compressive forces (illustrated as multiple arrows "F" in FIG. 2) are applied to peripheral edges 210, 212, 214, 216 of the plate 202, the peripheral edges 210, 212, 214, 216 are displaced inwardly, and the plate 202 deflects or bends to accommodate the inward displacement, and the alignment of the mounting surfaces 204, 206 changes relative to one another. The alignment changes as a function of the magnitude of the compressive forces. As the compressive forces change, the mounting surfaces 204, 206 are alignable over a range of alignments by deflection of peripheral edges of the plate. The range of alignments includes the nominal alignment.

The overmolded mounting base 200 also comprises an overmold 220. The term "overmold" as used in this application refers to a molded plastic resin part that engages peripheral edges of a metal part and surrounds the metal part. The process "overmolding" as used in this application refers to a process of molding a plastic resin part around a metal part so that the plastic resin part engages peripheral edges of the metal part. The overmold 220 engages the peripheral edges 210, 212, 214, 216 of the plate 202. The peripheral edges 210, 212, 214, 216 of the plate 202 are preferably enclosed by the overmold 220 so that the overmold 220 grips the plate 202 firmly. The thickness of the overmold 220 is preferably thicker than the plate 202.

The overmold 220 comprises a thermal stress relieved overmold such that the mounting surfaces have the nominal alignment. In one preferred embodiment, the overmold 220 comprises thermoset material, and in another preferred embodiment, the overmold 220 comprises thermoplastic material. The overmold 220 is preferably an injection molded plastic resin part. The plate 202 is preferably a metal insert that is present in an injection mold when the overmold 220 is molded over the peripheral edges 210, 212, 214, 216 of the plate 202. As the overmold 220 cools after molding, the overmold 220 shrinks at a rate that is greater than a rate of shrinkage of the plate 202. The difference in shrinkage rates causes the overmold 220 to exert the compressive forces F on the peripheral edges 210, 212, 214, 216.

In preferred arrangements, the overmold 220 is shaped to include additional structural features such as mounting slots 222, a filter holder 226, and an actuator crash stop 228.

The overmolded mounting base 200 can be scaled to a size to provide a CF card type II disc drive having a 5 millimeter thickness or a CF card type I disc drive having a 3.3 millimeter thickness. The overmolded mounting base 200 can also comprise a one inch disc drive or other size disc drives.

Figure 4A:
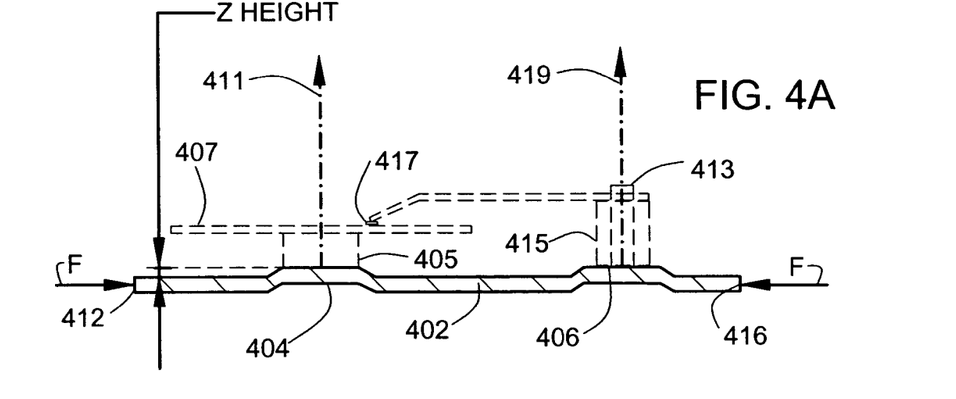
FIGS. 4A, 4B, 4C illustrate process steps in a method of manufacturing an overmolded mounting base.
Figure 4B:
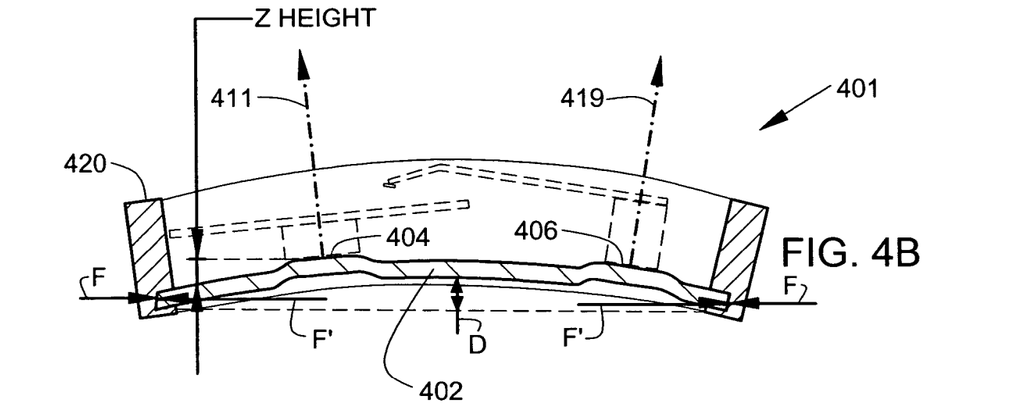
Figure 4C:
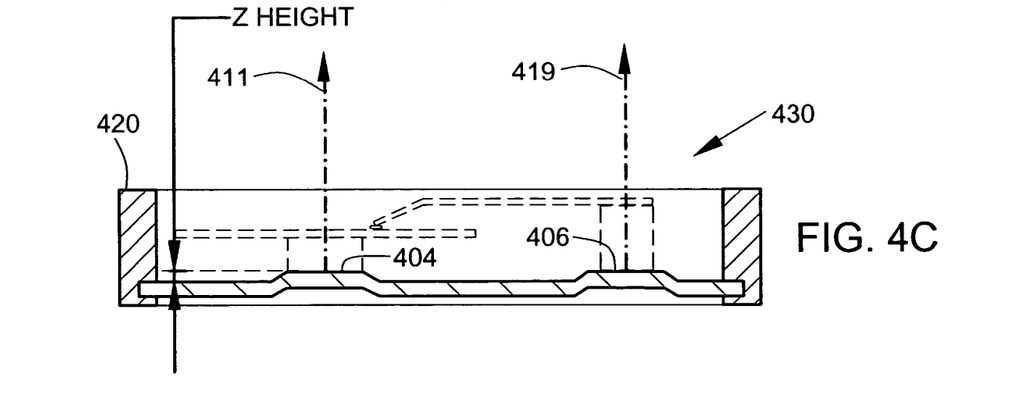

FIGS. 4A, 4B, 4C illustrate process steps in a method of manufacturing an overmolded mounting base 430. As illustrated in FIG. 4A, a plate 402 is provided with mounting surfaces 404, 406. The mounting surface 404 preferably comprises a spindle motor mounting for later mounting of a spindle motor 405 which supports a storage media disc 407. The mounting surface 406 preferably comprises an actuator pivot shaft mounting for later installation of a actuator pivot shaft 413.

The actuator pivot shaft 413 supports an actuator 415 that positions a head 417 on the storage media disc 407. The spindle motor 405, the storage media disc 407, the actuator pivot shaft 413, the actuator 415 and the head 417 are illustrated in dashed lines and are typically not present at the process step illustrated in FIG. 4A. An alignment of the surface 404 is represented by a normal vector 411, and an alignment of the surface 406 is illustrated by a normal vector 419. At the process step illustrated in FIG. 4A, the vectors 411 and 419 are typically in a nominal parallel alignment suitable for later mounting of components 405, 407, 413, 415, 417 such that the head 417 is operationally aligned with the disc 407.

The alignment of the vectors 411, 419 (relative to one another) can be changed over a range of alignments by the application of forces F to peripheral edges 412, 416. As illustrated, the plate 402 is a stamped metal part, however, it will be understood that plate 402 can also comprise a cast part such as a die cast aluminum part. The plate 402, whether stamped or cast, preferably has a thickness in the range of 0.3 to 0.4 millimeters in order to prove a compact design.

As illustrated in FIG. 4B, the plate 402 is overmolded with an overmold 420. The plate 402 comprises a metal insert in a plastic injection mold (not illustrated). The overmold 420 is injected into the plastic injection mold in a heated, liquid state. As the overmold 420 cools, the overmold 420 solidifies and shrinks in size and contracts to exert compressive forces F on the peripheral edges 412, 416. The plate 402 bends into a curved (bow) shape with a center deflection D illustrated in FIG. 4B. The plate 402 together with the overmold 420 form an assembly referred to here as a overmolded plate 401. With the plate 402 bent into this curve shape, the alignment of the mounting surfaces 404, 406 are changed relative to one another. The vectors 411, 419 are not parallel in FIG. 4B.

As illustrated in FIG. 4C, the overmolded plate 401 is heated, as an assembly, to a creep temperature of the overmold 420 and maintained at the creep temperature for a selected time interval. The creep temperature is below a melting temperature of the overmold so that the heating does not cause the overmold 420 to lose its general shape features. The creep temperature is above the normal operating temperature range of the overmold 420. The bowed plate 402 exerts forces F' (FIG. 4B) on the overmold 420 that are equal to and opposite the forces F that the overmold exerts on the plate 420. At the creep temperature, the overmold 420 is forced by the forces F' to creep (continuously deform) to relieve the forces F'. The creep of the overmold 420 in the process step illustrated in FIG. 4C relieves the shrinkage that caused the plate 402 to bow in FIG. 4B. As the creep deformation relieves the force F', the shape of plate 402 (FIG. 4C) returns to near its original shape (FIG. 4A) and the mounting surfaces 404, 406 (FIG. 4C) are returned closer to the nominal alignment. The overmolded plate 401 is maintained at a creep temperature for a time interval sufficient for creep to restore the nominal alignment. After the change in shape is complete, the overmolded plate 401 (FIG. 4B) is transformed by the process to a thermal stress relieved overmold 430 as illustrated in FIG. 4C. The vectors 411, 419 return to a parallel alignment in FIG. 4C. After cooling, components (illustrated in dashed lines) can be installed on the mounting surface 404, 406 and take advantage of the nearly nominal alignment. The process illustrated in FIG. 4C is described in more detail below in connection with FIGS. 5-7.

Figure 5:
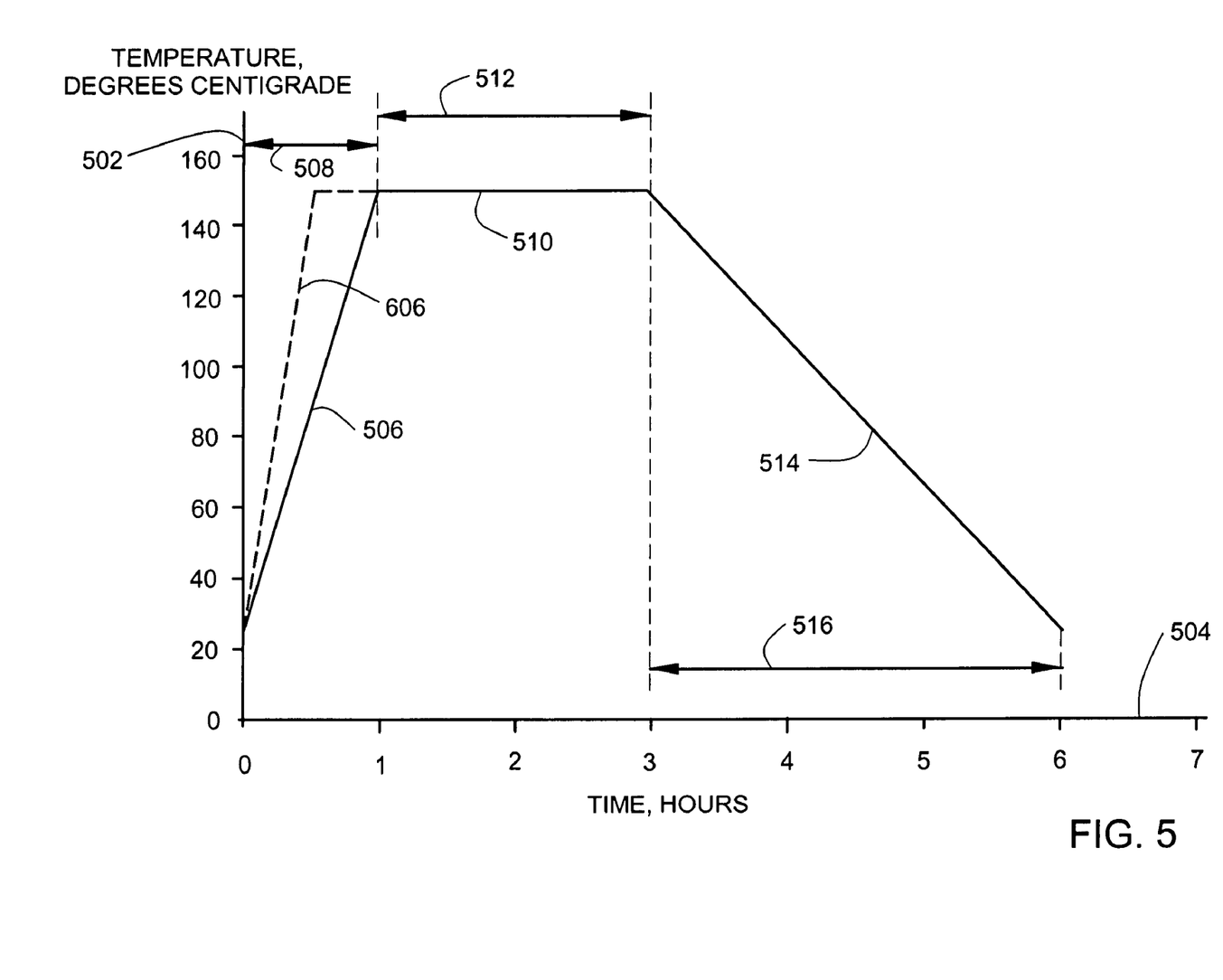
FIG. 5 illustrates a graph of a first embodiment of a thermal stress relief process for an overmolded base assembly.

FIG. 5 illustrates a graph of a thermal stress relief process of an overmolded base assembly. A vertical axis 502 represents a temperature of a temperature controlled environment surrounding the overmolded base assembly. A horizontal axis 504 represents time in hours that the overmolded base assembly is in the temperature controlled environment. The temperature controlled environment is provided by an oven or environmental chamber. The temperature controlled environment is typically an oven and the process is typically a batch process. The temperature controlled environment can alternatively be a belt oven with varying temperature zones to provide a continuous process. The temperature of the overmolded base assembly is slowly increased at 506 over a warm up time interval 508. In the example illustrated, the warm up time interval is about 1 hour and the temperature is increased from 25 degrees Centigrade (room temperature) to a creep temperature of about 150 degrees Centigrade. Creep temperatures in the range of 120-150 degrees Centigrade can be used for various thermoplastic materials. The thermal stress relief process has an added benefit of increasing outgassing from the overmold during the thermal stress relief process so that there is less outgassing during the operation of the disc drive.

The overmolded base assembly is maintained at 510 at the creep temperature for a time interval 512 sufficient for creep to restore the nominal alignment to the mounting surfaces. In the example illustrated, the time interval 512 is about 2 hours. The overmolded base assembly is then cooled at 514 back to room temperature over a cooling time interval 516. In a preferred arrangement, the overmolded base assembly is surrounded by a non-oxidizing cover gas while it is in the oven to avoid oxidation of the overmolded base assembly. In another preferred arrangement, the plate can be clamped or spring loaded to urge the plate back to its original shape without a bow. The clamping or use of springs temporarily increases the forces F' and speeds up the process of creep. In yet another preferred arrangement, a deflection sensor is coupled to the plate to sense the alignment, and the length of the time interval 512 is automatically controlled based on the deflection sensor output. The temperature profile illustrated in FIG. 5 is merely exemplary. The times and temperatures of the profile will vary depending on the creep properties of material used for the overmold and the dimensions and shapes of the overmold and the plate. While the plate is illustrated with blunt peripheral edges, it will be understood that the peripheral edges can be rounded or pointed to vary the times and temperatures needed for the creep process. In another example illustrated by dashed line 606, the warm up time interval is about 0.5 hour and the temperature is increased from 25 degrees Centigrade (room temperature) to a creep temperature of about 150 degrees Centigrade and held for about 2.5 hours before cooling.

Figure 6:
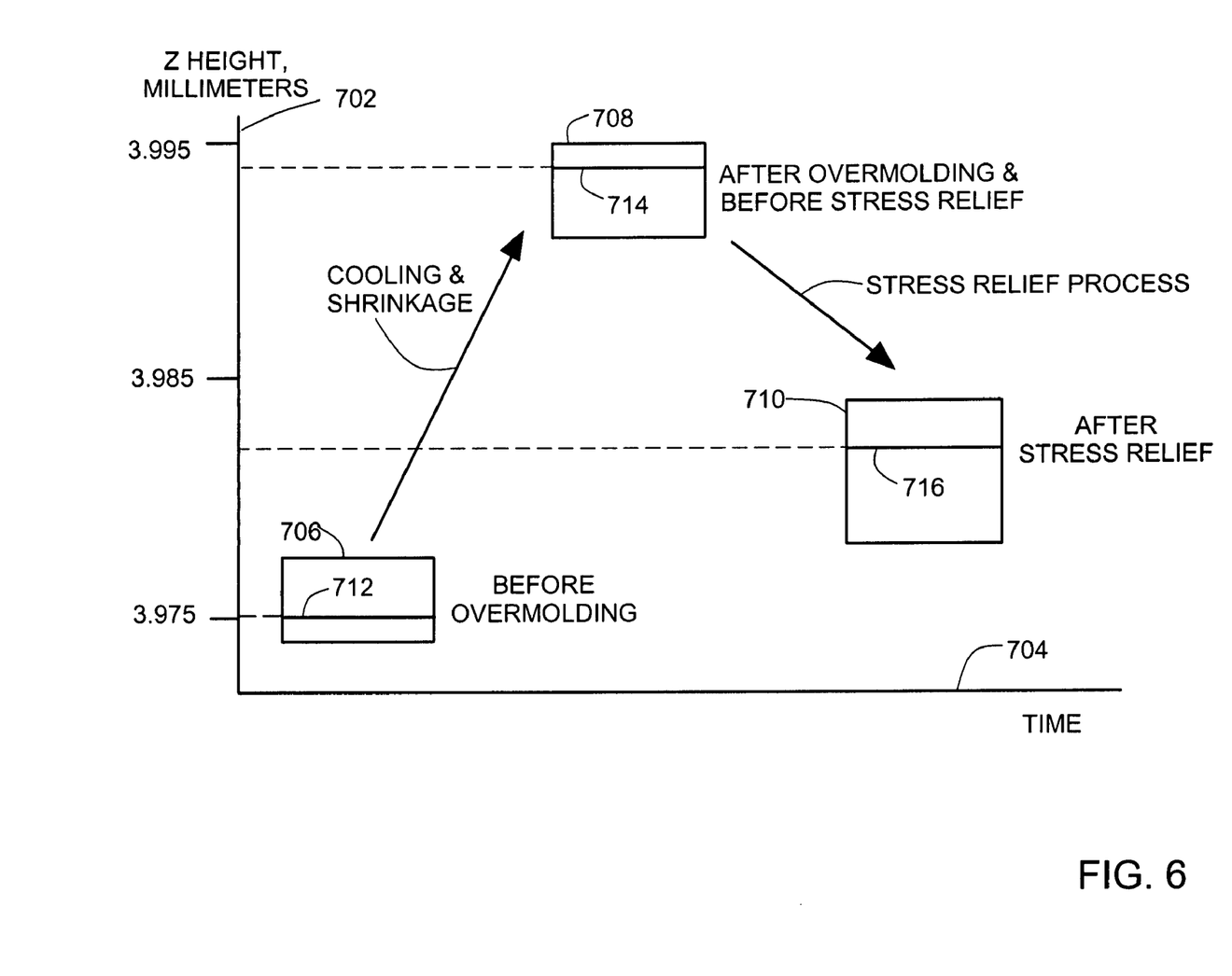
FIG. 6 illustrates results for a batch of overmolded base assemblies subjected to the temperature profile illustrated by a dashed line in FIG. 5.

FIG. 6 illustrates results for a batch of overmolded base assemblies subjected to the temperature profile illustrated by dashed line 606. A vertical axis 702 represents a dimensional measurement, Z height, in millimeters. An example of Z height is illustrated in FIGS. 4A, 4B, 4C. Variations in Z height away from a nominal Z height are a convenient measure that is approximately proportional to the amount of deflection D (FIG. 4B) at steps in a process of manufacturing an overmolded mounting base. The Z height comprises a measured vertical distance between a spindle motor mounting surface and a selected surface point near a peripheral edge of a plate. A horizontal axis 704 represents a time on a non-linear scale as the processes progress.

In FIG. 6, a vertical range of rectangles 706, 708, 710 represents a range of Z heights for the batch of overmolded base assemblies. Horizontal lines 712, 714, 716 within the rectangles represent average values of Z height for the batch. As illustrated at horizontal line 712, the average Z height for plates in the batch before overmolding is about 3.975 millimeter. As illustrated by horizontal line 714, the average Z height for plates in the batch after overmolding and cooling, but before stress relief is 3.994 millimeters. The Z height change for overmolding is 3.994-3.975=0.019 millimeters. As illustrated by horizontal line 716, the average Z height for plates decreases after stress relief to about 3.982 millimeters. An average Z height change of 0.019 millimeters due to overmolding is reduced to an average Z height change of only 0.007 millimeters after the stress relief process. The stress relief process relieves more than half of the distortion due to shrinkage during overmolding.

For overmolded base assemblies, the machining operations are performed before the overmolding process on the metal plates. It is not practical to perform machining operations on the plate after overmolding because a coating needs to be applied to the plate. Both the coating operation and machining operations can damage the plastic material of the base assemblies.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the overmolded mounting system while maintaining substantially the same functionality without departing from the scope of the present invention. In addition, although the preferred embodiment described herein is directed to a mounting base for a disc drive, it will be appreciated by those skilled in the art that the teachings of the present invention can be applied to covers for mounting on a base of a disc drive and other types of bases, without departing from the scope of the present invention.

What is claimed is:

1. An overmolded mounting base, comprising:
   a plate having mounting surfaces that are alignable over a range of alignments by deflection of peripheral edges of the plate, the range of alignments including a nominal alignment; and
   an overmold engaging the peripheral edges of the plate, the overmold comprising a thermal stress relieved overmold such that the mounting surfaces are restored toward the nominal alignment.

2. The overmolded mounting base of claim 1, wherein the mounting surfaces comprise a spindle motor mounting and an actuator pivot shaft mounting.

3. The overmolded mounting base of claim 1, wherein the plate comprises a stamped metal part.

4. The overmolded mounting base of claim 1 wherein the plate comprises an aluminum casting.

5. The overmolded mounting base of claim 1 wherein the overmold comprises a mounting slot.

6. The overmolded mounting base of claim 1 wherein the overmold comprises a filter holder.

7. The overmolded mounting base of claim 1 wherein the overmold comprises an actuator crash stop.

8. The overmolded mounting base of claim 1 wherein the overmold comprises a thermoset material.

9. The overmolded mounting base of claim 1 wherein the overmold comprises a thermoplastic material.

10. The overmolded mounting base of claim 1 wherein the overmold comprises an injection molded part.

11. The overmolded mounting base of claim 1 and further comprising a spindle motor mounted to a spindle motor mounted on a first mounting surface of the mounting surfaces.

12. The overmolded mounting base of claim 11 and further comprising a disc mounted to the spindle motor.

13. The overmolded mounting base of claim 12 and further comprising a voice coil motor mounted to a second mounting surface of the mounting surfaces.

14. The overmolded mounting base of claim 13 and further comprising a head suspended from the voice coil motor adjacent a surface of the disc.

15. The overmolded mounting base of claim 1 and further comprising a head/disc alignment between the head and the disc, and the restoration of the nominal alignment stabilizes the head/disc alignment.

16. The overmolded mounting base of claim 1 wherein the mounting base is scaled to a size of a CF card disc drive.

17. The overmolded mounting base of claim 16 wherein the disc drive has a thickness of 5 mm.

18. The overmolded mounting base of claim 16 wherein the disc drive has a thickness of 3.3 mm.

19. The overmolded mounting base of claim 1 wherein the plate has a nominal thickness in the range of 0.3 to 0.4 millimeters.

20. The overmolded mounting base of claim 1 wherein the plate is free of bowing due to unrelieved thermal stress.

* * * * *